United States Patent [19]

Giordanengo et al.

[11] Patent Number: 4,605,049
[45] Date of Patent: Aug. 12, 1986

[54] MULTIPLE CARVING MACHINE

[75] Inventors: Giovanni Giordanengo; Giorgio Cavallera, both of Boves, Italy

[73] Assignee: La Nuova Scolpitrice S.p.A., Italy

[21] Appl. No.: 684,398

[22] Filed: Dec. 20, 1984

[30] Foreign Application Priority Data

Dec. 20, 1983 [IT] Italy .................. 54060 B/83

[51] Int. Cl.$^4$ .............................................. B27C 5/00
[52] U.S. Cl. ............................. 144/144 R; 51/50 PC;
51/140; 144/134 B; 144/137; 409/105; 409/108
[58] Field of Search .............. 51/34 A, 50 PC, 140,
51/142, 145 R; 409/89, 90, 91, 105, 106, 108;
144/144 R, 144 A, 137, 134 A, 134 B, 134 C

[56] References Cited

U.S. PATENT DOCUMENTS

| | | | |
|---|---|---|---|
| 447,796 | 3/1891 | Smith et al. | 409/108 |
| 588,662 | 8/1897 | Seaman | 144/144 A |
| 1,439,215 | 12/1922 | Young | 409/108 |
| 1,494,088 | 5/1924 | Widman | 409/108 |
| 2,046,563 | 7/1936 | Kirby et al. | 409/105 |
| 4,382,727 | 5/1983 | Schmidt | 409/105 |

FOREIGN PATENT DOCUMENTS

2722369A1  11/1978  Fed. Rep. of Germany .

Primary Examiner—W. D. Bray
Attorney, Agent, or Firm—Sughure, Mion, Zinn, Macpeak, and Seas

[57] ABSTRACT

Multiple wood working machine having a base supporting a work bench having retaining members for the pieces to be worked and for a pattern piece, and an articulated parallelogram work frame carrying working tools for the pieces and a feeler member for the pattern piece.

The work frame is constituted by two adjacent half-frames connected to the base and to an upper support structure by means of an articulated arm system including two symmetrical lateral linkages and a central linkage which is inverted relative to the lateral linkages.

4 Claims, 6 Drawing Figures

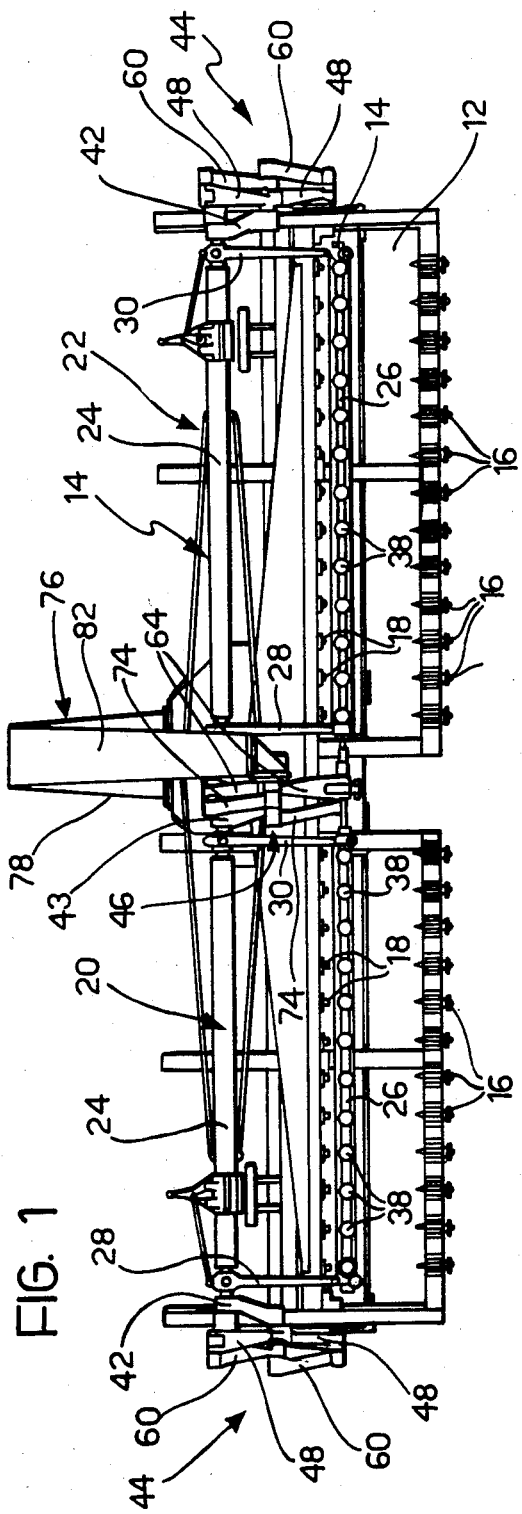
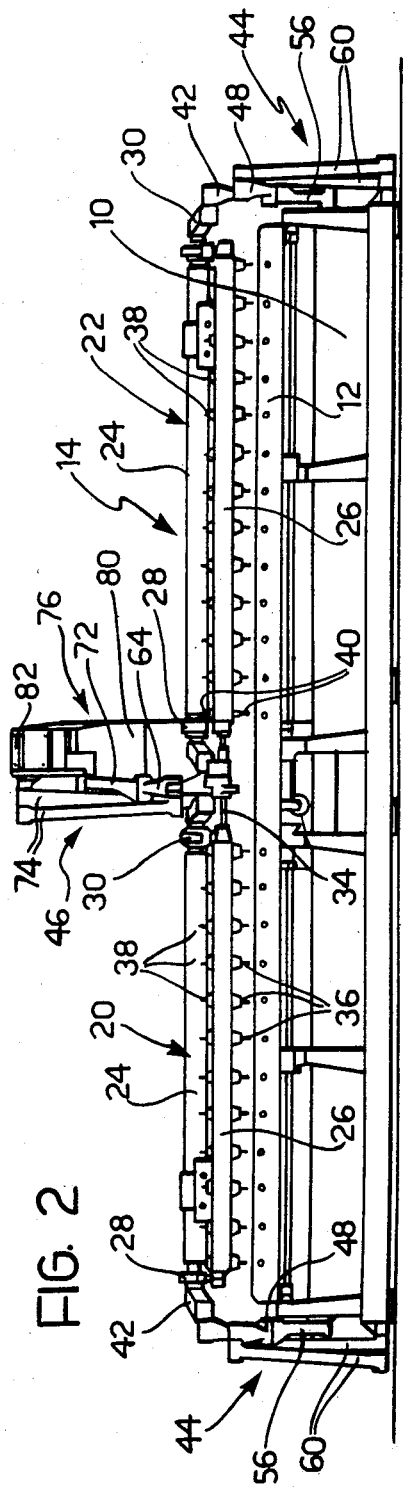

MULTIPLE CARVING MACHINE

The present invention relates to multiple working machines for the simultaneous working of a plurality of pieces, normally of wood, in a manner identical to a pattern piece.

More particularly, the invention relates to a multiple working machine including a base which supports a work bench having a plurality of retaining members for the workpieces to be worked and a pattern piece, a work frame in the form of an articulated parallelogram which is displaceable above the work bench and carries on its front side a plurality of working tools and a feeler member for engagement with the pattern piece, and an articulated arm system which interconnects the rear side of the work frame and the base to allow horizontal and vertical movements of the work frame relative to the bench.

A working machine of this type is described and illustrated in German patent application No. 27 22 369. According to this application, the articulated arm system includes two symmetrical lateral linkages located vertically at the sides of the work frame and each including four connecting rods articulated in a rhombus by means of an upper pin connected to the work frame, a lower pin and two side pins. Respective shorter arms are articulated at their upper ends to the lower pins of the respective rhombi and at their lower ends to the base about a first common horizontal axis and respective longer arms are articulated at their upper ends to the side pins of the respective rhombi and at their lower ends to the base about a second common axis located below the said first axis. The distance between the first and second axes is equal to the distance between the first axis and the axis of the lower pin, or to the operative length of the shorter arm.

The conformation of the two linkages which make up the articulated arm system allows precise uniformity of the movement of the working tools to be achieved relatively simply and reliably during the longitudinal, transverse and vertical movement of the work frame relative to the bench.

The present invention is an improvement in the machine according to the German patent application cited above and has the object of providing a working machine of the type referred to which has a higher operational capacity by virtue of a longer work frame, while retaining the simplicity and the practicality of the system for moving the work frame.

According to the invention, this object is achieved by virtue of the fact that the work frame is constituted by two facing half-frames interconnected along their front and adjacent sides by respective front and rear connections in that a support structure extends above the connection between the two half-frames and in that the articulated arm system further includes a supplementary vertical central linkage similar to the said lateral linkages but inverted relative thereto for connecting the rear connection between the two half-frames to the said support structure.

This characteristic allows a machine to be formed with a much longer work frame and hence a considerably greater operational capacity than the machine described in the German patent application referred to above without this entailing excessive structural complications. Indeed, the components of the supplementary linkage of the articulated arm system are entirely identical to those of the two lateral linkages, which is extremely advantageous from the point of view of simplicity of manufacture of the working machine.

Furthermore the disposition of the supplementary linkage in an inverted configuration relative to the two lateral linkages allows any changes or modifications in the work bench to be avoided, except, of course, its adaptation to the dimensions of the longer work frame.

Further characteristics and advantages of the invention will become evident during the detailed description which follows, with reference to the appended drawings, provided purely by way of non-limiting example, in which:

FIG. 1 is a plan view from above of a multiple working machine according to one embodiment of the invention;

FIG. 2 is a front elevational view of the machine shown in FIG. 1;

Figure 3:
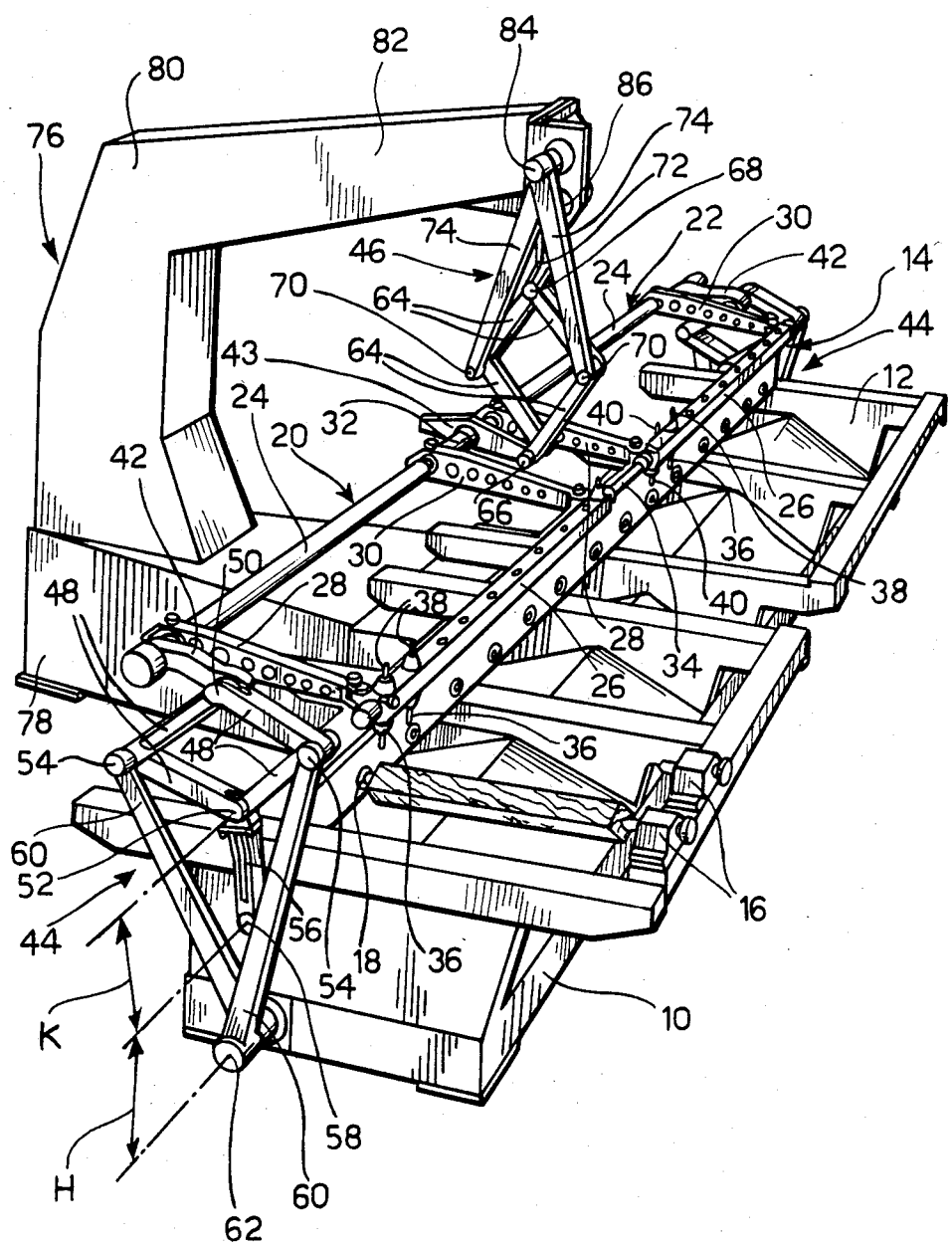
FIG. 3 is a schematic perspective view of the working machine.

The illustrated machine is for the multiple working of wood workpieces and includes essentially a base 10 above which is supported a horizontal working bench 12. A work frame 14 is movable above the work bench 12.

The work bench 12 is arranged to receive a pattern piece and a series of workpieces to be worked alongside the pattern piece. When the pieces are to be worked on a single face (for example furniture panels, bas-reliefs and the like) the bench 12 has a simple bearing surface with conventional clamp members for the pieces. When, however, the pieces are to be worked around their periphery (for example statues, furniture legs and the like) the bench 12 has, as in the embodiment illustrated, a series of headstocks 16 and tailstock 18 arranged to support, for rotation about their axes, the pattern piece and the pieces to be worked.

The work bench 12 has a length which is considerably greater than that of conventional working machines, and is normally between 6 and 15 m.

The work frame 14, the length of which corresponds to that of the work bench 12, is formed according to the invention by two half-frames 20 and 22 arranged side-by-side.

Each of the half-frames 20, 22 includes a rear support bar 24 and a rotatable tool-carrying front bar 26 interconnected by two end cross members 28, 30 each of which is articulated to the rear and front bars 24, 26. The two rear bars 24 and the two front bars 26 are rigidly interconnected at the adjacent inner ends of the two half-frames 20 and 22 by means of rear and front connecting parts 32, 34 respectively, so that the work frame 14 in effect has an overall configuration of an articulated parallelogram. In other words, the front bars 26 are able to move translationally simultaneously relative to the rear bars 24, that is, parallel to the longitudinal axis of the work table 12.

The two front bars 26 carry two opposing series of rotary working tools, a roughing tool 36 and a finishing tool 38 respectively, with substantially vertical axes, as well as at least one double feeler member 40 arranged like the tools 36 and 38. The two front bars 26 can be rotated about their common axis selectively to dispose the roughing tools 36 or the finishing tools 38 in working positions projecting downwardly, that is towards the pieces carried by the work bench 12.

The front bars 26 of the work frame 14, in addition to the horizontal translational movements parallel to the longitudinal axis of the bench 12, can also move translationally parallel to the transverse axis of the bench 12, and vertically.

For the vertical movement the two outer ends of the two rear bars 24 and the central zone of the rear connecting part 32 are connected, for rotation about the longitudinal axis of the bars 24, respectively, to two side support arms 42 and a central support arm 43 carried by two lateral articulated arm linkages 44 and a supplementary central articulated arm linkage 46.

The two lateral linkages 44 and the central linkage 46 interconnect the work frame 14 and the base 10, allowing, as will become evident below, horizontal movements of the work frame 14 parallel to the transverse axis of the work bench 12.

Each of the two lateral linkages 44 includes, as described in detail in the German patent application mentioned at the beginning, four connecting rods 48 of equal length located in the configuration of a rhombus and having their ends articulated respectively about an upper pin 50 carried by the corresponding arm 42, a lower pin 52 and two side pins 54. To the lower pins 52 there is also articulated the upper end of a shorter arm 56 the lower end of which is articulated to the base 10, being connected to one end of a longitudinal shaft 58 connected at its other end to the shorter arm 56 of the other linkage 44, the shaft 58 extending internally through the base 10 and defining a first common horizontal axis for the linkages 44.

The side pins 54 are articulated to the upper ends of two longer arms 60 the lower ends of which are articulated about a common stub shaft 62 projecting outwardly from the base 10 below the longitudinal shaft 58, the stub shafts 62 having a second common horizontal axis.

The working length of each of the shorter arms 56, or the distance K between the axis of the shaft 58 and that of the respective lower pin 52, is equal to the distance H between the first and second axes, that is, the axis of the shaft 58 and the axis of the stub shafts 62.

The central auxiliary linkage 46 has a configuration entirely identical to that of the two lateral linkages 44, with the single exception that it is inverted relative thereto.

The central linkage 46 in fact includes four connecting rods 64 identical to the connecting rods 48 and articulated in a rhombus about a lower pin 66 carried by the central arm 43, an upper pin 68 and two side pins 70.

To the upper pin 68 there is articulated the lower end of a shorter arm 72 identical to the shorter arms 56 of the two linkages 44 and the two side pins 70 are articulated to the lower ends of two longer arms 74 identical to the longer arms 60.

The shorter arm 72 and the two longer arms 74 interconnect the central part of the work frame 14 and a support structure 76 carried by a rear projection 78 of the base 10. The support structure 76 includes a pillar 80 carrying a cantilever arm 82 projecting forwardly above the work bench 12. The free end of the arm 82 carries a pin 84 to which are articulated the upper ends of the longer arms 74 and a pin 86 located beneath the pin 84 and to which is articulated the upper end of the shorter arm 72.

Again in this case, the distance H between the pins 84 and 86 is equal to the distance K between the pins 86 and 68.

In operation, the work frame 14 is moved manually by the operator by means of a front hand grip 88 (FIG. 5) so as to move the working tools 36 or 38 along the pieces to be worked in accordance with the shape of the pattern piece on which the feeler member 40 bears. As stated above, translational movements parallel to the longitudinal axis of the work bench 12 are effected by virtue of the articulated connections between the front tool carrier bars 26 and the rear bars 24 and vertical movements are achieved as a result of rotation of the two half-frames 20, 22 of the frame 14 about the axis of the rear bars 24. In order to facilitate this rotation and avoid any imbalance which could involve the operator in having to exert excessive force, counterweights, not illustrated, are provided for balancing the weight of the frame 14.

The translational movement parallel to the transverse axis of the work bench 12, or the advance and withdrawal of the frame 14 relative to the operator, is achieved by means of the two lateral articulated arm linkages 44 and the central articulated arm linkage 46. In fact, when the operator draws the handgrip 88 closer to himself or moves it away, the two pins 52 of the lateral linkages 44 and the pin 68 of the central linkage 46 move along respective circular arcs about the axis of the longitudinal shaft 58 and the axis of the pin 86. Simultaneously the pins 54 and the pins 70 move along circular arcs about the axis of the shafts 62 and the axis of the pin 84 respectively, deforming the articulated rhombi constituted by the connecting rods 48 and 64. Since, as stated above, the distances H and K are equal, this deformation leads to a horizontal linear movement of the pins 50 and 66 and hence of the frame 14 and of the working tools 36 and 38 carried thereby.

Figure 4:
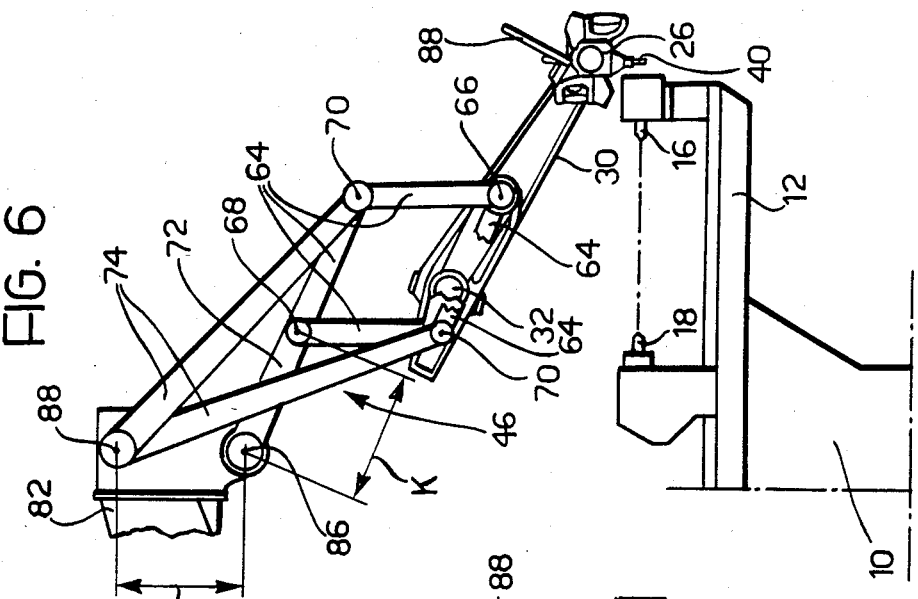
FIGS. 4, 5 and 6 are three schematic side elevational views on an enlarged scale of a detail of the working machine in three different operative conditions.
Figure 5:
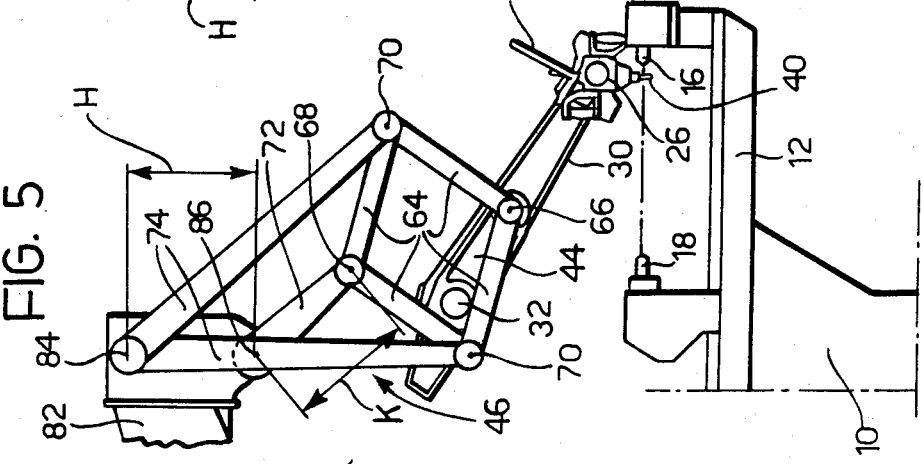
Figure 6:
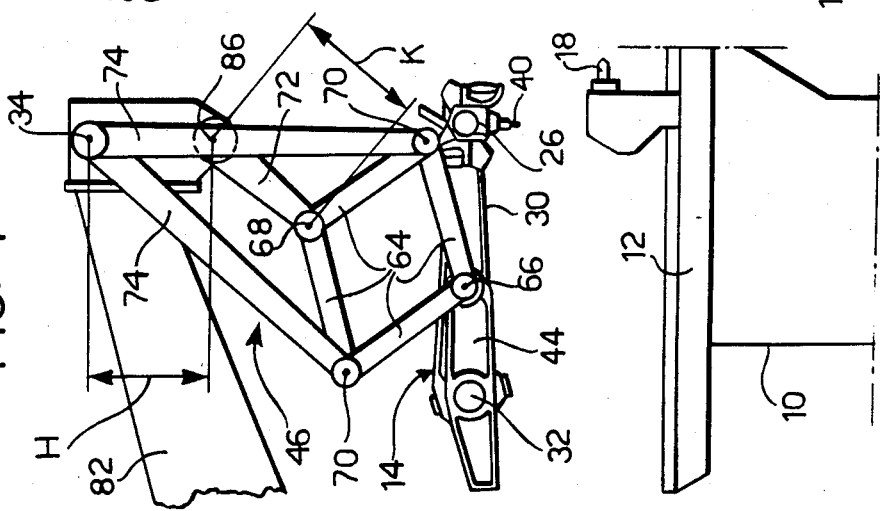

FIGS. 4, 5 and 6 show different operative conditions of the frame 14 corresponding to different configurations of the central linkage 46, it being understood that corresponding configurations are adopted by the two side linkages 44, but inverted with respect to the central linkage 46.

In the position illustrated in FIG. 4, the work frame 14 is raised and completely withdrawn from the work bench 12. In the position of FIG. 5, the frame 14 is lowered and partially advanced relative to the frame 12, while in the position of FIG. 6 the frame 14 is again lowered but completely advanced relative to the work bench 12.

What is claimed is:

1. Multiple working machine for the simultaneous working of a plurality of workpieces, including:
   a base,
   a work bench supported by the base and having a plurality of retaining members for pieces to be worked and for a pattern piece,
   a work frame in the form of a generally horizontal articulated parallelogram having a front side and a rear side, the work frame being movable above the work bench and carrying on its front side a plurality of working tools for the pieces to be worked and a feeler member for engagement with the pattern piece, and
   an articulated arm system interconnecting the rear side of the work frame and the base and including two symmetrical lateral linkages located vertically in correspondence with the sides of the work frame, each said linkage including an upper pin connected to the work frame, a lower pin and two side pins, four connecting rods articulated together in a rhombus by said pins, a shorter arm articulated at its upper end to the lower pin of the rhombus and at its lower end to the base about a first common horizontal axis, and two longer arms articulated at their upper ends to said pins of the rhombus and at their lower ends to the base about a second common axis located below said first axis, the distance between said first and second axes being equal to the distance between the first axis and the axis of said lower pin, wherein the improvements comprise
- (a) the said work frame comprises two adjacent half-frames, and respective front and rear connections interconnecting said half-frames along their front and rear sides, and a support structure extending above said connections between the two half-frames, and
- (b) the articulated arm system further includes a supplementary vertical central linkage, similar to said lateral linkages but inverted relative thereto, connecting the rear connection between said half-frames to the said support structure.

2. Working machine as defined in claim 1, wherein said support structure carries upper and lower fixed pivot pins and the supplementary central linkage includes an upper pin, a lower pin, two side pins, and four connecting rods articulated together by said pins in a rhombus, the lower pin of the rhombus being connected to said work frame, a shorter arm articulated at its lower end to the upper pin of the rhombus and at its upper end to said support structure about the lower fixed pivot two longer arms articulated at their lower ends to the side pins of the rhombus and pivotally connected at their upper ends to the support structure about the upper fixed pivot pin, the distance H between the axes of the upper and lower fixed pivot pins being equal to the distance K between the axis of the lower fixed pivot pin and that of the upper pin of the rhombus.

3. Working machine as defined in claim 1 wherein the base has a rear appendage and the support structure includes a pillar supported by the rear appendage and a cantilever arm projecting forwardly from the pillar above the work bench.

4. Working machine as defined in claim 2 wherein the base has a rear appendage and the support structure includes a pillar supported by the rear appendage and a cantilever arm projecting forwardly from the pillar above the work bench.

* * * * *